Jan. 3, 1939.  O. H. SIEWEK  2,142,876
FIXTURE LOCK
Filed April 19, 1937
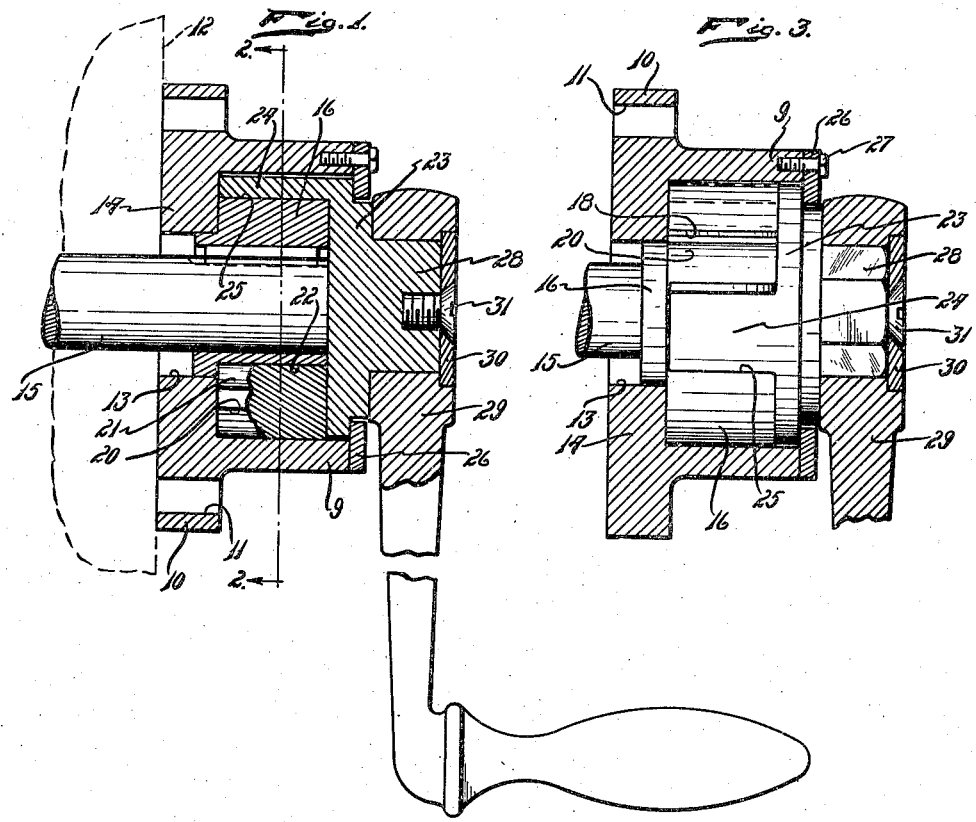
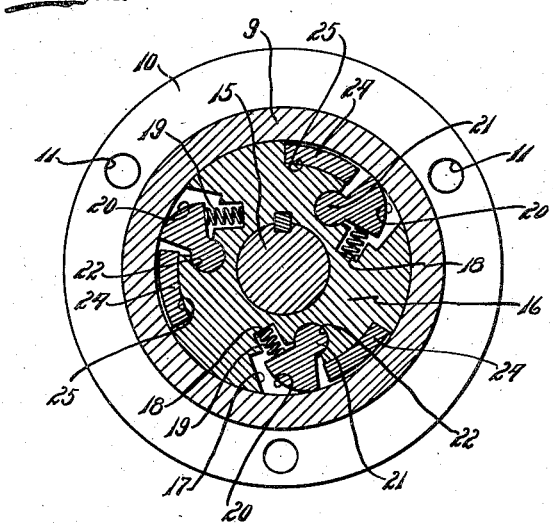
INVENTOR.
OTTO H. SIEWEK
BY
ATTORNEY.

Patented Jan. 3, 1939

2,142,876

UNITED STATES PATENT OFFICE 2,142,876

FIXTURE LOCK

Otto H. Siewek, Ferndale, Mich.

Application April 19, 1937, Serial No. 137,599

3 Claims. (Cl. 192—8)

My invention relates to a new and useful improvement in an automatic fixture lock so constructed and arranged that it may be easily and quickly operated, easily and quickly assembled, and economically manufactured.

It is another object of the present invention to provide a fixture lock of this class so constructed and arranged that a positive locking against reverse rotation is effected while at the same time easy release of the locking means for direct rotation may be accomplished.

Other objects will appear hereinafter.

The invention consists in the combination and arrangement of parts hereinafter described and claimed.

The invention will be best understood by a reference to the accompanying drawing which forms a part of this specification and in which, Fig. 1 is a vertical sectional view of the invention with parts broken away and parts shown in section.

Fig. 2 is a sectional view taken on line 2—2 of Fig. 1.

Fig. 3 is a central sectional view showing the actuating mechanism in elevation.

The invention comprises a cup-shaped retaining block 9 having the flange 10 provided with openings 11 through which screws may be projected to secure this retaining block stationary on a suitable supporting body 12 with which used. As enlarged opening 13 is formed in the base 14 of this retainer and a shaft 15 is shown projecting through this opening into the retainer. Keyed to this shaft 15 and positioned within the retainer is a circular locking head or disk 16. Formed in the periphery of this head or disk 16 is a plurality of spaced grooves or recesses 17 which extend axially of the head or disk 16 from face to face. Communicating with each of these grooves or recesses are pockets 18 in which is positioned a spring 19 projecting at one end outwardly from the pocket into the groove or recess 17. At each of these grooves or recesses I provide a locking member and these locking members are of such a length as to terminate at and also end flush with the outer faces of the head or disk 16. Each of these locking members has a curved outer surface or periphery 20 and each is formed segmental in cross section and terminates at the inner end in a substantially cylindrical edge portion or bead 21 which seats in the circular groove 22 formed at the base at each of the grooves or recesses 17. It will be noted that the groove 22 having the curvi-linear surface is located at one of the corners of the recess or groove 17 and projects inwardly of the head therefrom. The construction is such that these locking members may rock on their cylindrical bead forming portion 21 and when the head or disk 16 is positioned within the cup shaped retainer 9 the springs 19 serve to normally maintain these locking members pressed outwardly into close engagement with the inner surface of the retainer 9.

The operating portion comprises a circular head 23 having spaced legs or prongs 24 projecting from the periphery thereof and extending axially. These legs or prongs 24 engage in the space provided at the cut away portion 25 on the periphery of the head or disk 16. This cut away portion 25 communicates with the pocket or groove 17. A retaining ring 26 is secured by bolts 27 to the retainer for securing the head 23 in position. Projecting centrally outwardly from the head 23 is a boss 28 provided with flat faces and over which may engage the socket of a wrench or crank 29, a retaining plate 30 being secured by the screw 31 on the boss 28 to retain the operating handle in position. The construction is such that the head or disk 16 may be rotated counterclockwise in the view shown in Fig. 2 with comparative freedom. Thus the fixture or tool, which may be operated by the shaft 15, may be moved to the desired position by rotating the head or disk 16 counterclockwise in the view shown in Fig. 2. The reverse rotation of the head or disk 16, that is the rotation of this head or disk 16 in a clockwise direction is prevented by the locking members. The spring 19 serves to press the locking member outwardly into close engagement with the periphery of the retainer 9. It will also be noted that this segmental portion of the locking member contacts the inner surface of the retainer 9 slightly off center, that is, slightly off its own center, considering the center of the substantially cylindrical portion 21 as the center pivot of the locking member. Since there is frictional contact between the curved surface of the locking member and the inner surface of the retainer 9 an attempted clockwise rotation of the head 16 relatively to the retainer 9 would tend to rock the locking member towards center and this attempt to rock the locking member toward center would lock the head or disk 16 in fixed relation to the retainer 9. In order to effect a clockwise movement of the head or disk 16 relatively to the retainer 9 the operating tool is provided and by rotating this operating tool in a clock-wise direction the edges of the legs 24 will engage the locking members and force them to rock on their pivots against the compression of the springs 19 thus releasing these locking members from close frictional engagement with the member 9 sufficiently to permit the relative rotation of the members 16 and 9. As soon as this pressure against the locking members by the legs 24 is released, the springs 19 will function to force the locking members tightly against the inner surface to produce sufficient friction so as to prevent the locking members from riding over the inner surface and tending to rock these locking members on their pivots.

It is thus seen that I have provide a clamping device which is simple in its structure and economical of manufacture while at the same time a most efficient locking device is provided.

While I have illustrated and described the preferred form of construction I do not wish to limit myself to the precise details of structure shown but desire to avail myself of such variations and modifications as may come within the scope of the appended claims.

What I claim as new is:

1. An automatic fixture lock of the class described, comprising: a stationary cup-shaped retainer; a rotatable shaft projected, at one end, into said retainer; a head fixedly mounted on said shaft and positioned within said retainer, said head having a plurality of spaced, axially extending recesses formed in its periphery, each of said recesses opening, at its base, into the side of a substantially cylindrical axially directed opening; a lock member positioned in each of said recesses; a bead on the inner edge of each of said locking members engaging in the groove communicating with the base of the recesses for swingably mounting said locking member in said recess, said bead being larger than the opening establishing communication between said recess and said groove, the engagement of said bead in said groove preventing radial withdrawal of said locking member from said recess, said locking members engaging at their outer sides the inner surface of said retainer and being normally swung off center, the attempted relative rotation of said head in said retainer, in one direction, tending to swing said locking members toward center, said locking members, upon swinging toward center from normal position, effecting a clamping of said head and said retainer in fixed relation.

2. An automatic fixture lock of the class described, comprising: a stationary cup-shaped retainer; a rotatable shaft projected, at one end, into said retainer; a head fixedly mounted on said shaft and positioned within said retainer, said head having a plurality of spaced, axially extending recesses formed in its periphery, each of said recesses opening, at its base, into the side of a substantially cylindrical axially directed opening; a lock member positioned in each of said recesses; a bead on the inner edge of each of said locking members engaging in the groove communicating with the base of the recesses for swingably mounting said locking member in said recess, said bead being larger than the opening establishing communication between said recess and said groove, the engagement of said bead in said groove preventing radial withdrawal of said locking member from said recess, said locking members engaging at their outer sides the inner surface of said retainer and being normally swung off center, the attempted relative rotation of said head in said retainer, in one direction, tending to swing said locking members toward center, said locking member, upon swinging toward center from normal position, effecting a clamping of said head and said retainer in fixed relation; and separable means inserted into said retainer for engaging said locking members and moving the same in the direction away from center for effecting the release of said retainer and said head.

3. An automatic fixture lock of the class described, comprising: a stationary cup-shaped retainer; a rotatable shaft projected, at one end, into said retainer; a head fixedly mounted on said shaft and positioned within said retainer, said head having a plurality of spaced, axially extending recesses formed in its periphery, segmental in cross section and communicating at their apices through the side of an axially directed groove; a locking member, segmental in cross section positioned in each of said recesses; a bead on the edge of each of said locking members engaging in the groove communicating with the apex of the recess for swingably mounting said locking member in said recess, said bead being larger than the opening through which said recess communicates with said groove for preventing radial withdrawal of the locking member from the recess, said locking members engaging at their outer sides the inner surface of said retainer and being normally swung off center, the attempted relative rotation of said head in said retainer, in one direction, tending to swing said locking members toward center, said locking members, upon swinging toward center from normal position, effecting a clamping of said head and said retainer in fixed relation.

OTTO H. SIEWEK.